United States Patent [19]

Bannister et al.

[11] Patent Number: 5,668,862

[45] Date of Patent: Sep. 16, 1997

[54] METHOD AND APPARATUS FOR PROVIDING USER CONTROLLED CALL MANAGEMENT SERVICES

[75] Inventors: Cecil H. Bannister; F. Marco Marchetti, both of Plano; Richard C. Mo, Dallas; Tod W. Switzer, Allen; Dhawal Balkrishna Moghe, Plano, all of Tex.

[73] Assignee: Northern Telecom Limited, Quebec, Canada

[21] Appl. No.: 609,629

[22] Filed: Mar. 1, 1996

Related U.S. Application Data

[62] Division of Ser. No. 466,189, Jun. 6, 1995, Pat. No. 5,548,636, which is a continuation of Ser. No. 75,332, Jun. 11, 1993, abandoned.

[51] Int. Cl.$^6$ ............................................. H04M 3/42
[52] U.S. Cl. .................. 379/201; 379/67; 379/211; 379/265; 379/93.01; 379/93.26
[58] Field of Search ............................ 379/265, 266, 379/201, 67, 58, 211, 233, 82, 207, 212, 142, 88, 89, 127, 118

[56] References Cited

U.S. PATENT DOCUMENTS

| | | | |
|---|---|---|---|
| 3,534,175 | 10/1970 | Schultz | 379/207 |
| 4,757,267 | 7/1988 | Riskin | 379/201 |
| 4,899,358 | 2/1990 | Blakley | 379/67 |
| 5,029,196 | 7/1991 | Morganstein | 379/211 |
| 5,099,511 | 3/1992 | Matsumoto | 379/233 |
| 5,181,239 | 1/1993 | Jolissaint | 379/266 |
| 5,199,062 | 3/1993 | Von Meister et al. | 379/211 |
| 5,206,901 | 4/1993 | Harlow et al. | 379/211 |
| 5,243,642 | 9/1993 | Wise, Jr. et al. | 379/82 |
| 5,307,399 | 4/1994 | Dai et al. | 379/58 |
| 5,309,513 | 5/1994 | Rose | 379/266 |
| 5,327,486 | 7/1994 | Wolf et al. | 379/211 |
| 5,329,578 | 7/1994 | Brennan et al. | 379/67 |
| 5,329,593 | 7/1994 | Jurgensen et al. | 379/266 |
| 5,335,269 | 8/1994 | Steinlicht | 379/266 |
| 5,357,558 | 10/1994 | Yoshikawa | 379/233 |
| 5,361,295 | 11/1994 | Solomon et al. | 379/211 |
| 5,375,161 | 12/1994 | Fuller et al. | 379/211 |
| 5,384,831 | 1/1995 | Creswell et al. | 379/127 |
| 5,388,150 | 2/1995 | Schneyer et al. | 379/67 |
| 5,430,791 | 7/1995 | Feit et al. | 379/211 |
| 5,440,620 | 8/1995 | Slusky | 379/211 |

FOREIGN PATENT DOCUMENTS

| | | |
|---|---|---|
| 2240693 | 8/1991 | United Kingdom . |
| 91 07 838 | 5/1991 | WIPO . |
| 91 09 483 | 6/1991 | WIPO . |

OTHER PUBLICATIONS

Smith, "Data Plus Shows Off Enhanced Automatic Call System", Washington Technology, (1987) p. 8.

*Primary Examiner*—Krista M. Zele
*Assistant Examiner*—Scott Wolinsky
*Attorney, Agent, or Firm*—Foley & Lardner

[57] ABSTRACT

A method of providing call screening to a subscriber of personal communication services facilitates the screening of incoming calls by associating the number dialed by a calling party with a function or role of the dialed number. This function or role is then sent to the subscriber when an incoming call is received. This way, the subscriber can decide whether to answer the incoming call based upon knowing the role or context associated with the dialed number. The subscriber is also provided with user controlled features which can be invoked by the use of DTMF codes. The subscriber can place a calling party on hold prior to answering the incoming call. In addition, the subscriber can proceed with a call transfer from a wireless telephone to a wired telephone and vice-versa, while the call is still in progress. Another feature allows the subscriber to implement a real-time call screening, while the calling party is leaving a message on voice mail. Yet another feature provides a wide area virtual extension to several subscribers such that an incoming call will be simultaneously routed to each subscriber in the group, as if their telephones were extensions of each other.

5 Claims, 7 Drawing Sheets

METHOD AND APPARATUS FOR PROVIDING USER CONTROLLED CALL MANAGEMENT SERVICES

This application is a division of application Ser. No. 08/466,189, filed Jun. 6, 1995, which issued as U.S. Pat. No. 5,548,636 on Aug. 20, 1996, which is a continuation of Ser. No. 08/075,332 filed Jun. 11, 1993, now abandoned.

FIELD OF THE INVENTION

This invention relates to personal communication services (PCS), but more particularly, to a system and method for providing the service subscribers with more flexibility in handling incoming calls.

BACKGROUND OF THE INVENTION

New telephone features have recently been introduced to provide telephone subscribers with enhanced personal communication services. These features are designed to make it easier for a calling party to reach the subscriber. For example, in one instance, a single personal telephone number is provided to a customer of the service. This personal telephone number is associated with a customer profile which is designed to assist in the routing of an incoming call, regardless of their physical location. In a typical scenario, a caller can attempt to reach the subscriber by dialing the personal telephone number that has been assigned to that subscriber. A call connection will be attempted according to the subscriber's profile. The subscriber's profile is used to route the call according to where the subscriber is expected to be at that time and day, that is, at the subscriber's home, office, automobile if the subscriber has a cellular telephone or simply to a voice messaging system.

The problem with these new services, is that in making the subscriber more reachable, the implementation of call management services have become much more difficult. Also, since practically anyone can reach the subscriber regardless of his location, the subscriber has to rely on the service to screen incoming calls. Any changes to the subscriber weekly schedule will have to be entered in the system, either by the subscriber or by a service provider's operator. Also, regular calls routed directly to the subscribers home, office or cellular telephone will not be screened by the service.

Accordingly, there is a need for personal communication services wherein call screening is facilitated by associating the number dialed by a calling party with a function or role of the dialed number. That is, a private role for calls directed to a home or cottage number, a business role for calls directed to the office, a social role for calls directed to the baseball or country club, etc. This function or role is then sent to the subscriber when an incoming call is received. In addition, the Calling Party Identification (CLID) and/or name will also be sent to the subscriber. In this way, the subscriber can decide to answer the incoming call knowing the role or context associated with the dialed number.

Similarly, another form of telephony that has seen tremendous growth is in the area of wireless telephony. Unfortunately, portable telephone users, regardless of whether they are using cellular or low power wireless type telephones, have very few services available to them for screening incoming calls. For example, although an incoming call will in most instances reach the portable phone user, the user's call management options will normally be limited to a) answering the call or b) have the call sent to voice mail.

Accordingly, there is a need for personal communication services which other than providing enhanced reachability for the subscriber, will give a cellular or portable telephone user additional services in handling and screening incoming calls.

SUMMARY OF THE INVENTION

According to the system and method of the present invention, various levels of personal communication services can be provided without the problems associated with the existing PCS services. In particular, a service node is used by the service provider, such as a Local Exchange Carrier (LEC) to provide the subscriber with the ability to screen incoming calls based on the role or function associated with the numbers dialed by a calling party. A mobility service node provides the LEC with the intelligence required to service incoming calls to subscribers.

Thus, in accordance with a first feature of the present invention, a service provider can provide call screening to subscribers based on the role or function associated numbers. With this feature, a subscriber receives not only the calling number ID and/or name of the calling party, but also the function or role associated with the number dialed by the calling party. For example, when a calling party is dialing the subscriber's home or cottage telephone number, the call will be associated with a private role. A call to the business number will be associated with a Business role. Therefore, call screening can be enhanced by having the role associated with the number dialed sent to the subscriber along with the CLID and/or name of the calling party. Thus, upon receiving the call, the subscriber can determine from the display the associated role of the called number and decide how to handle the incoming call.

In accordance with another feature of the present invention, a subscriber having a portable terminal can invoke a call-on-hold feature when an incoming call is received, if he or she is unable to immediately answer the call. This would be the case when the subscriber is unable to talk privately, is in a noisy environment or can be disruptive to others, such as in meetings, elevators, cafeteria, bus stop, etc. This feature would be activated while the subscriber's terminal is ringing by pressing a terminal function key, such as *2. A message would then be offered to the calling party prompting him or her to "please wait and the call will be answered shortly". In the mean time, the subscriber can move to a more convenient location or more suitable environment to answer the call. The subscriber can then get connected to the incoming call by dialing another terminal function key, such as *1 on the telephone keypad.

In accordance with another feature of the present invention, a subscriber can invoke an Access Independent Hand-off feature which allows a subscriber to transfer a call from a wireless terminal to a wireline set and vice-versa while remaining connected to the calling party.

In accordance with another feature of the present invention, a service provider can offer a Wide Area Virtual Extension (WAVE) feature to a group of subscribers wherein calls directed to say, a PRIVATE telephone (e.g., home) number, will be routed to alerting devices of multiple subscribers in the group (e.g., husband and wife). Those responding to the incoming call will then be conferenced in to the call, as if each telephone were extensions of each other.

In accordance with another feature of the present invention, a subscriber can invoke a real-time call screening feature wherein an incoming call is routed to Voice Mail. While the calling party is recording a message on Voice Mail, the subscriber can listen in real-time the calling party's voice. If the subscriber recognizes the calling party or the message content, the subscriber can make a connection with the calling party by pressing the required key (e.g., *2), and at the same time exiting voice mail. The voice mail system does not retain any such interrupted messages.

Accordingly, it is an aspect of the present invention to provide a method of providing improved call screening to subscribers of personal communication services, comprising the steps of:

assigning a role to a network address provided to a subscriber of said personal communication services;

storing a list of all network addresses and corresponding roles in a subscriber database;

assigning a separate network address corresponding to a call alerting device used by said subscriber to receive incoming calls;

storing said separate network address in said subscriber's database;

accessing said subscriber database when a call from a calling party is directed to one of said network address on said list;

identifying the role assigned to the network address to which the call is directed;

routing the identified role to said separate network address associated with said subscriber's call alerting device; and establishing a voice path from said calling party to said subscriber's call alerting device when going off-hook.

In accordance with another aspect of the present invention there is provided a method of providing improved call screening to subscribers of personal communication services, comprising the steps of:

routing incoming calls directed to any one of a number of network addresses provided to a subscriber, to a call alerting device used by the subscriber to receive incoming calls, wherein a role associated to each network address is routed to said subscriber call alerting device before the incoming call is answered, such that call screening is improved.

In accordance with yet another aspect of the present invention there is provided a method of providing user controlled personal communication services (PCS) for users of call alerting devices, wherein specified communication services can be invoked by the user prior to answering a call from a calling party, comprising the steps of:

storing, in a service node database, a list of network addresses at least one of which is assigned to a PCS subscriber;

storing for each subscriber listed in said database, a separate network address associated with the subscriber's alerting device;

storing for each subscriber listed in said database, a list of DTMF codes and associated services that a subscriber can invoke when an incoming call is received;

accessing said database when an incoming call to one of said network addresses on said list is received at said service node, to determine where the call should be routed;

determining the call alerting device and associated separate network address of the called subscriber;

establishing a voice path between the alerting device and the calling party if the subscriber goes off-hook;

accessing said list of DTMF codes in said database if a DTMF code is received from said subscriber, to determine the requested communication service; and enabling the selected service.

In accordance with yet another aspect of the present invention there is provided a method of providing user controlled call transfer from a first call alerting device to a second call alerting device while a call is in progress between a PCS subscriber and a calling party, comprising the steps of:

establishing a link from said second alerting device to a service node connected to a host switch, said host switch providing a voice path between said calling party and said subscriber using said first call alerting device;

sending a DTMF code from said second alerting device to said service node, said DTMF code corresponding to a request for a call in progress transfer;

instructing said host switch to establish a conference bridge such that a second voice path is established between said second alerting device and said calling party; and releasing said first voice path, such that said call can continue between said calling party and said subscriber on said second alerting device.

DESCRIPTION OF THE PREFERRED EMBODIMENT

Figure 1A:
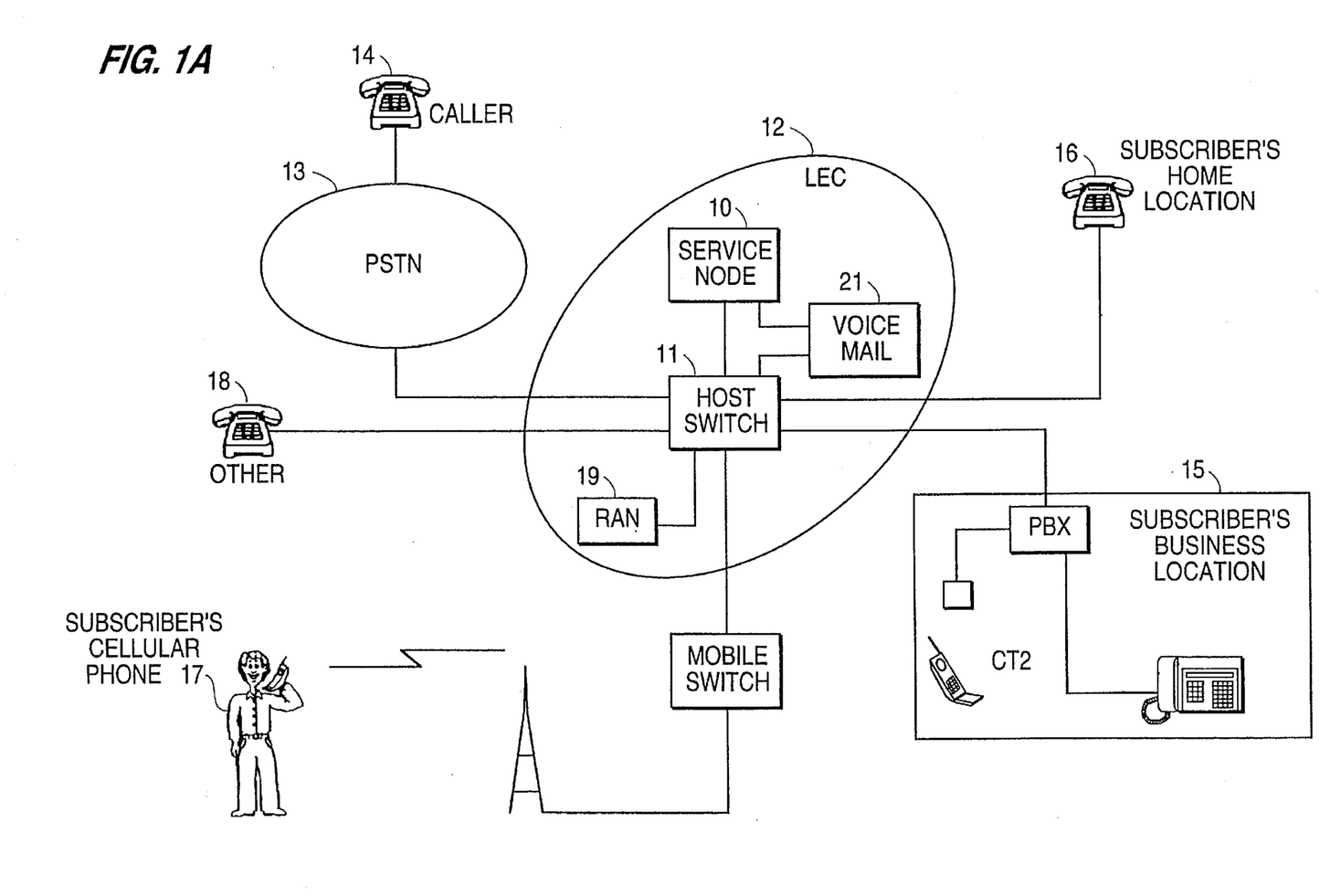
FIG. 1A is a block diagram illustrating the interaction of a mobility service node with a Local Exchange Carrier and the Public Switched Telephone Network.

As is shown in FIG. 1A, a service node 10 for providing PCS services is connected to a host switch 11 at the Local Exchange Carrier (LEC) 12. The host switch 11 is also connected to the Public Switched Telephone Network (PSTN) 13. The host switch 11 can, for example, be comprised of a central office switch, such as a DMS-100 (Trademark) digital telephone switch, or a Private Branch Exchange, such as an SL-1 (Trademark), both available from Northern Telecom. When a caller 14 dials anyone of the PCS subscriber's role numbers (e.g. home location 16, business location 15, other 18, etc.), the PSTN will direct the call to the LEC associated with the digits dialed. At LEC 12, the call is intercepted by the host switch 11 to determine whether the called subscriber has access to the PCS service. This will be determined by comparing the dialed number with subscriber telephone numbers in a database at service node 10. If the dialed number corresponds to one of the numbers in the PCS subscriber's list, then from this point on, the service node 10 will interact with the host switch 11 to attempt call completion to the subscriber's alerting devices, according to the subscriber's profile contained at the service node 10. The alerting device can be, but is not limited to, the subscriber's pager, subscriber's portable telephone, home line, business line, etc. The subscriber can select anyone of the alerting devices listed, by accessing the service node. A description of the interaction between the service node and a subscriber is described in U.S. Pat. No. 5,329,578. In FIG. 1A, the subscriber could select the cellular telephone 17 as the alerting device when outside of the business location 15 and a portable low power wireless type telephone CT2 when inside the business location. As will be shown further, the service node enables the LEC to provide PCS services from the most basic call-on-hold to the more advanced call origination/delivery using role or function associated numbers.

Figure 1B:
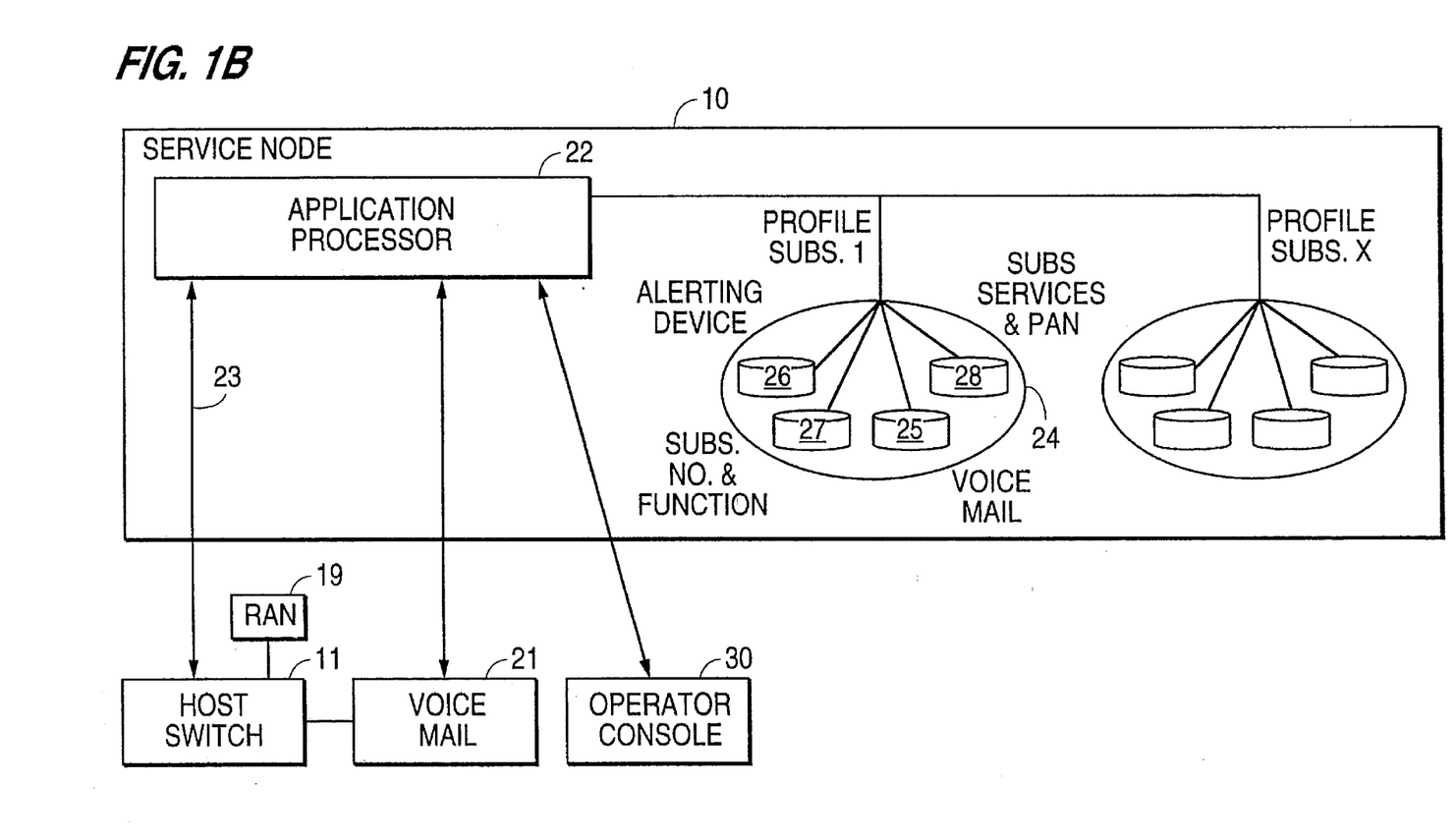
FIG. 1B is a block diagram of one embodiment of the mobility service node for providing the PCS services of the present invention.

As shown in FIG. 1B, the service node 10 interacts with the host switch 11 and voice mail 21, by making use of an application processor 22 for accessing service profiles 24 of one or more subscribers. These components are currently available from Northern Telecom, as Meridian Mail Voice Processor (MMVP), and dual processor Meridian Application Equipment Module (AEM). Meridian is a Registered Trademark of Northern Telecom.

Network connectivity and switching functions can be carried out by a voice switch (not shown), or the host switch 11. The service node 10 is connected to host switch 11 and the PSTN network 13 via an ISDN Primary Rate Access (PRA) link 23, or an equivalent link able to carry voice and signaling information. Call information includes the original dialed number, calling line identification, call redirection information, called number, etc.

The Recording Announcement (RAN) module 19 can either be part of a Meridian Voice Mail system or connected directly to the host switch 11 as a RAN module via a T1 link and a universal trunk module line card. The RAN module is available from Northern Telecom. The RAN module 19 provides voice prompts to a calling party when the service node is interfacing with the caller. For example, a typical voice prompt would be "Please hold while we try to connect you to —John Doe—."

The application processor 22 makes use of databases 24 which contain the service profiles of the PCS subscribers, for providing the subscriber with communication mobility and incoming call management. Database 24, can either form an integral part of the application processor 22, or be part of a separate storage facility.

One of the files making up the subscriber's profile is the voice messaging file 25. This file contains information about the subscriber's voice messaging service, such as what types of message will be played, access codes required for accessing voice mail from a remote location, etc.

Another file which makes up the subscriber's profile and which stores information about the subscriber's alerting device(s) is the alerting device file 26. This file contains the type of alerting device, e.g. pager, portable (low power wireless) type terminals or cellular telephone. The Directory Numbers DN associated with each device would be stored on this file. An example of a typical Alerting Devices List is shown below in Table 1.0

TABLE 1.0

| DEVICE | NUMBER |
|---|---|
| CELLULAR TELEPHONE | 444-1212 |
| PORTABLE LOW POWER WIRELESS TELEPHONE | 444-1313 |
| OTHER DEVICES | NUMBER |
| PAGER: | 551-1155 |
| TYPE: | DIGITAL |
| MESSAGE SYSTEM: | 922-2222 |
| MAILBOX NUMBER: | 1234 |
| MAILBOX PASSWORD: | 555 |
| MWI COORDINATION: | YES |
| OPERATOR: | 333-4567 |

In TABLE 1.0, "Numbers" show the Directory Numbers (DN) associated with each alerting device, whereas "Device" show the type of alerting device selected by the subscriber for receiving incoming calls.

"Other Devices" include the possible destinations for completing calls when a subscriber can't be reached. These can be a pager, a messaging system, or a private operator console 30. Sufficient information is provided to allow PCS to complete the call to these destinations.

Referring again to FIG. 1B, another file which also makes up the subscriber's profile is the Subscriber Number & Function List 27. This list contains the network addresses and types of telephones used by the subscriber and the usual role or function associated with those telephones. An example of a Subscriber Number & Function List is shown below in TABLE 2.0.

TABLE 2.0

| ROLE | NUMBER | LOCATION |
|---|---|---|
| PERSONAL | 123-1234 | HOME |
|  | 777-1234 | COTTAGE |
| BUSINESS | 555-1234 | OFFICE |
| SOCIAL | 666-1234 | YACHT CLUB |

"ROLE" define the social roles associated with the subscriber. For example, the subscriber will have a private role associated with home and the cottage, a business role at the office, and a social role at the baseball or yacht club.

"Number" is the network address of the telephone device associated with that role. Under a basic PCS service of the present invention, if a call is directed to anyone of these numbers it will be routed to the subscriber's selected alerting device with the role associated with the number dialed, the CLID and/or name of the calling party displayed on that device. The subscriber can then answer the incoming call according to the role associated with the called number. If a display is not available, a text-to-speech application can be used to verbalize the information which would normally be shown.

Also part of the subscriber's profile is the Subscriber's Services & PAN List 28. This list indicates the type of services the subscriber can invoke, keys required to activate the service and the subscriber's Personal Access Number (PAN) required to complete a connection when certain types of services are invoked (e.g. call-on-hold, access-independent-handoff, etc.) An example of a Subscriber Services list is shown in TABLE 3.0.

TABLE 3.0

| SUBSCRIBER | SERVICE | KEY | PAN |
|---|---|---|---|
| ALICE | CONNECT | *1 | 12345 |
| | HOLD | *2 | |
| | REAL TIME CALL SCREENING | *3 | |
| | ACCESS INDEPENDENT HANDOFF | *4 | |

Also part of the subscriber's profile are other Data files which store other subscriber information necessary to operate PCS or provide the subscriber with prompt and courteous operator service. An example of this data is shown below in TABLE 4.0.

TABLE 4.0

| NAME: | SUBSCRIBER NAME |
|---|---|
| PASSWORD: | 1234 |
| MESSAGING PASSWORD: | 9876 |
| CALLING CARD #: | 416 555-1212 XXXX |
| LANGUAGE: | ENGLISH |
| ALLOWED FEATURES: | PAGER, SYSTEM OPERATOR REVERT, URGENCY |
| CALL URGENCY QUERY: | PRIORITY |
| ROTARY DEFAULT | NORMAL |

NOTES:
CUSTOMER IS HARD OF HEARING - SPEAK SLOWLY AND CAREFULLY WHEN GIVING ASSISTANCE

"Name" and "Notes" are examples of textual comment fields which can be associated with the subscriber profile to facilitate service.

"Password" is the identification number for the subscriber, which can be used for operator verification of subscriber identity, or when the subscriber is calling the Subscriber Service Interface.

"Calling Card #" is used to charge PCS placed calls when the subscriber has directed calls to a location not local to the host switch 11.

"Language" is the language to be used for the playing prompts to Subscriber's callers.

"Allowed Features" indicates which features this subscriber has access to. The options listed in Table 4.0 are for example only, and may vary according to what is specified by the PCS service provider.

"Call Urgency Query" can be "none", "priority", or "emergency". If "none", calls which are not assigned an urgency in the caller list will always be assumed "normal".

If a Numeric/Digital pager is used as an alerting device by the PCS subscriber, the pager receives and displays an alpha numeric message associated with the incoming call. The PCS service node can provide the pager with the CLID and name of the caller and the role associated with the called number, if this information is known.

The service node 10 together with the host switch 11 and RAN module 19 are adapted to receive/send voice and signaling information there between. The host switch 11 is adapted to initiate, establish and transfer calls and generate DTMF signalling to external devices. The external devices can be a pager, or external voice messaging system. As indicated above, the RAN module 19 stores various prompts which are sent to the calling party or the subscriber, when either is communicating with the system. The RAN module 19 sends this information along a voice channel (not shown) once established. These prompts are usually the ones provided by the service provider, such as "Please hold while we try to connect you to —John Doe—". The voice mail unit 21 is used for the recording and playback of the voice of an incoming caller, when the caller is asked to leave a message, or of the subscriber, when the subscriber wants to modify the welcoming message of his or her voice mail.

The host switch 11 is also able to detect and recognize DTMF tones sent by the calling party or subscriber, when either is connected to service node 10. Similarly, the host switch can detect call progress tones which allow the system to detect busy, fast busy, reorder, ringing, etc., when the service node instructs the host switch to place a call. The Calling Line identification (CLID), called number, incoming calls, end of call, reason for call forwarding, answer supervision, etc. are also all detected by the host switch 11. The type of information received will of course be dependent on the connection technology used.

The following-description of FIGS. 2A–2D is directed at describing the flow of information during a call scenario for the features of the present invention. The precise interface that a caller has with the PCS service node will depend on the subscriber's requirements and the specific PCS features in use for the subscriber. In some cases, it is possible that the caller will not have any obvious interaction with the PCS service node, and in others, will respond to Call Queries and be provided with status information. The caller can make use of single-digit DTMF commands to interface with the subscriber's PCS service node. Similarly, a subscriber can also modify its PCS profile using DTMF commands. These can, for example, be:

enter PIN (e.g. used by subscriber to the profile);
operator assistance request (zero key);
skip over welcome message (# key);
skip directly to messaging (numeral 6 key); and
subscriber's service activation keys (*key)

Additionally, callers may be requested to make a Call Completion or Call Urgency determination via DTMF signals. The PIN can be 4 to 7 digit numbers depending on the network providing the PCS service.

Call Delivery Using a Role or Function Associated Number

Figure 2A:
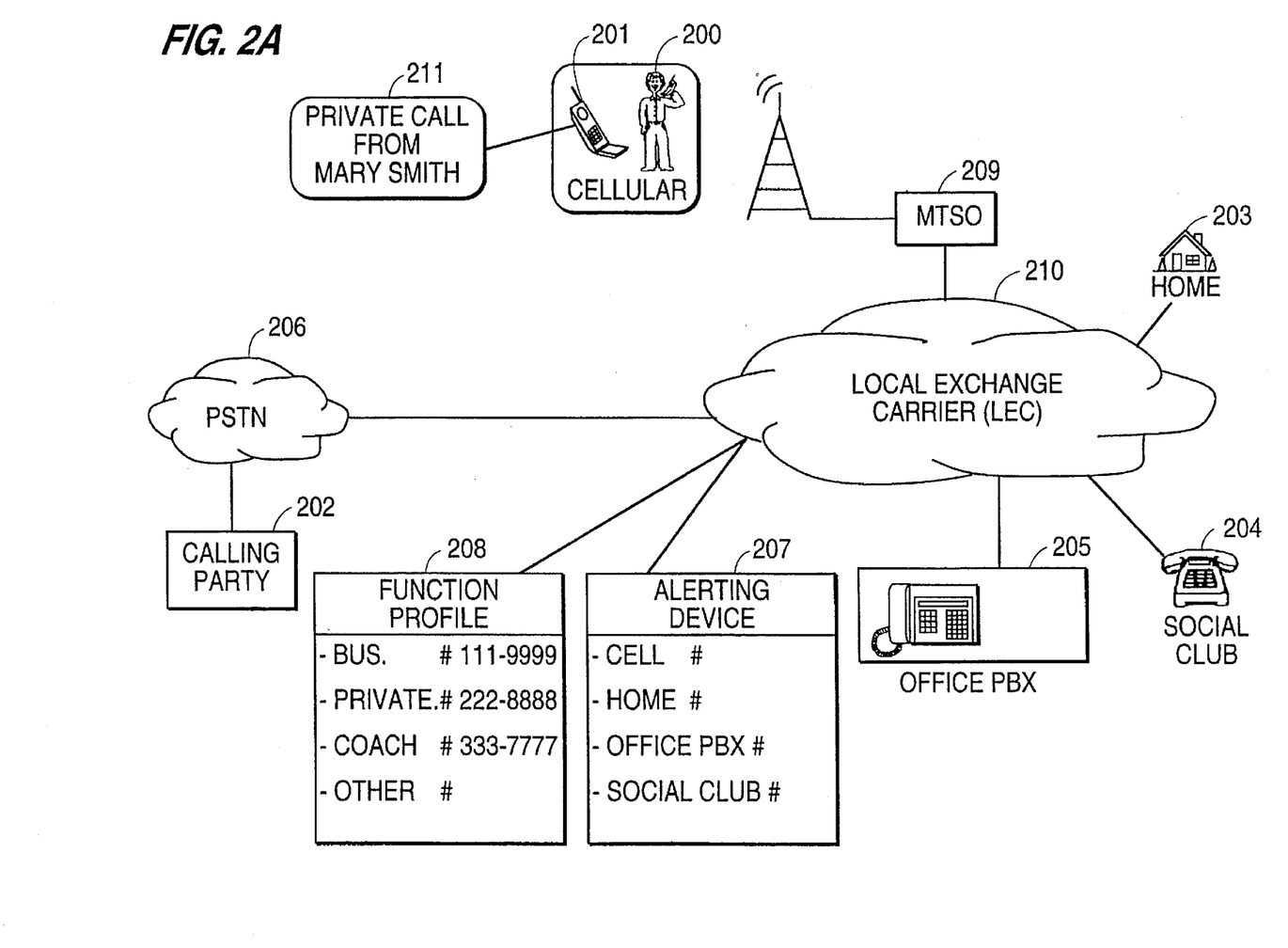
FIG. 2A shows a typical call scenario using the Role or Function Associated Number feature.

Referring now to FIG. 2A, we have illustrated a typical call scenario using the call delivery feature of the present invention. In this example, the subscriber 200 is making use of a cellular telephone 201 as an alerting device. In attempting to reach the subscriber, calling party 202 can dial anyone of the subscriber's telephone numbers associated with the subscriber's private role 203, social role 204 or business role 205. As an example, not knowing where the subscriber 200 is located, a friend will dial the subscriber's private number 222-8888. The call will be routed from the calling party 202 via the Public Switched Telephone Network (PSTN) 206 to the Local Exchange Carrier (LEC) 210. At the LEC (see FIG. 1A & 1B), the host switch 11 will query the service node 10 and the subscriber database 24 to determine how the incoming call will be routed. For a non-PCS subscriber, the call would simply be routed to the home telephone 203. On the other hand, with a PCS subscriber, once the call is received at the host switch and is identified as being to a PCS subscriber, the service node 10 will take control of the call such that it is routed to the alerting device identified by the service profile of the subscriber. Thus, at the service node 10, the subscriber database 24 and more specifically the subscriber number and function list database 27 will identify that the dialed number is the network address to be associated with the PRIVATE role of subscriber 200. It will also identify that the subscriber has selected the cellular telephone as an alerting device. A combination of the alerting device database 26 and subscriber number and function database 27 is shown in FIG. 2A at reference numeral 207 and 208, respectively. The network address stored in the database corresponds to a role that the subscriber has assigned to it. The number also corresponds to the digits dialed by the calling party when making a call to the subscriber. However, it is to be noted, that the telephone device used at the subscriber's home 203, social club 204 or office 205, may actually have a different network address. The network addresses of these devices could be unlisted, such that any call directed to those devices originates or is routed via the service node only. The subscriber would only need to provide the telephone numbers associated with a selected role. For example, he would provide the 111-9999 number to business clients and associates, the 222-8888 number to family and friends, and as a coach, would provide the 333-7777 number to, say, the players on the little league baseball team.

In operation, the hose switch 11 will send a ring back signal to calling party 202 and initiate a call to the PCS subscriber at the directory number of the selected alerting device, which is, in this case the cellular telephone 201. In addition, host switch 11 will send to the subscriber's alerting device 201, the role associated with the directory number dialed by the calling party along with the CLID and/or name of the calling party. This would of course be routed via the MTSO 209. Although the mobile telephone switching office (MTSO) 209 is shown located at the LEC 210, it could also be located anywhere on the PSTN 206. Upon receiving the call, the subscriber's alerting device 201 will display (if so equipped) the CLID or name of the calling party along with the role associated with the number dialed, i.e. PRIVATE. The subscriber can therefore answer knowing that this call is directed to his private role, rather than if it was a call associated with his business or social roles. The display presented to the called party may look like the one shown at reference numeral 211. Of course, if the LCD display of the telephone used as the alerting device can only show one line, the display could be made to scroll. In instances where the subscriber does not have a suitable LCD display or no displays, voice prompts would be used to verbalize the information shown. In this case, the recording announcement module 19, shown in FIG. 1A, could be used by the subscriber to initially, record such messages as "this is a PRIVATE call from", "this is a BUSINESS call from", etc. Of course, the message could also be a standard prerecorded voice message from the PCS service provider. Similarly, the calling party could either be asked to state his or her name when the call reaches the service node or could be an audio (synthesized) voice automatically converted from the CLID data. Thus, the subscriber would hear the voice recording/playback unit 44 play "this is a PRIVATE call from" "Mary Smith". This information would be transmitted over the ringing signal, as in the case of CLID.

As indicated above, the subscriber can select any one of a number of alerting devices, including his or her home telephone. In this case, if the subscriber is at home 203, the network address of the roles would not change. However, instead of having calls routed to the cellular telephone 201, the service node would route incoming calls to a separate network address associated with the telephone device used at the subscriber's home 203.

Call-on-hold Feature

Figure 2B:
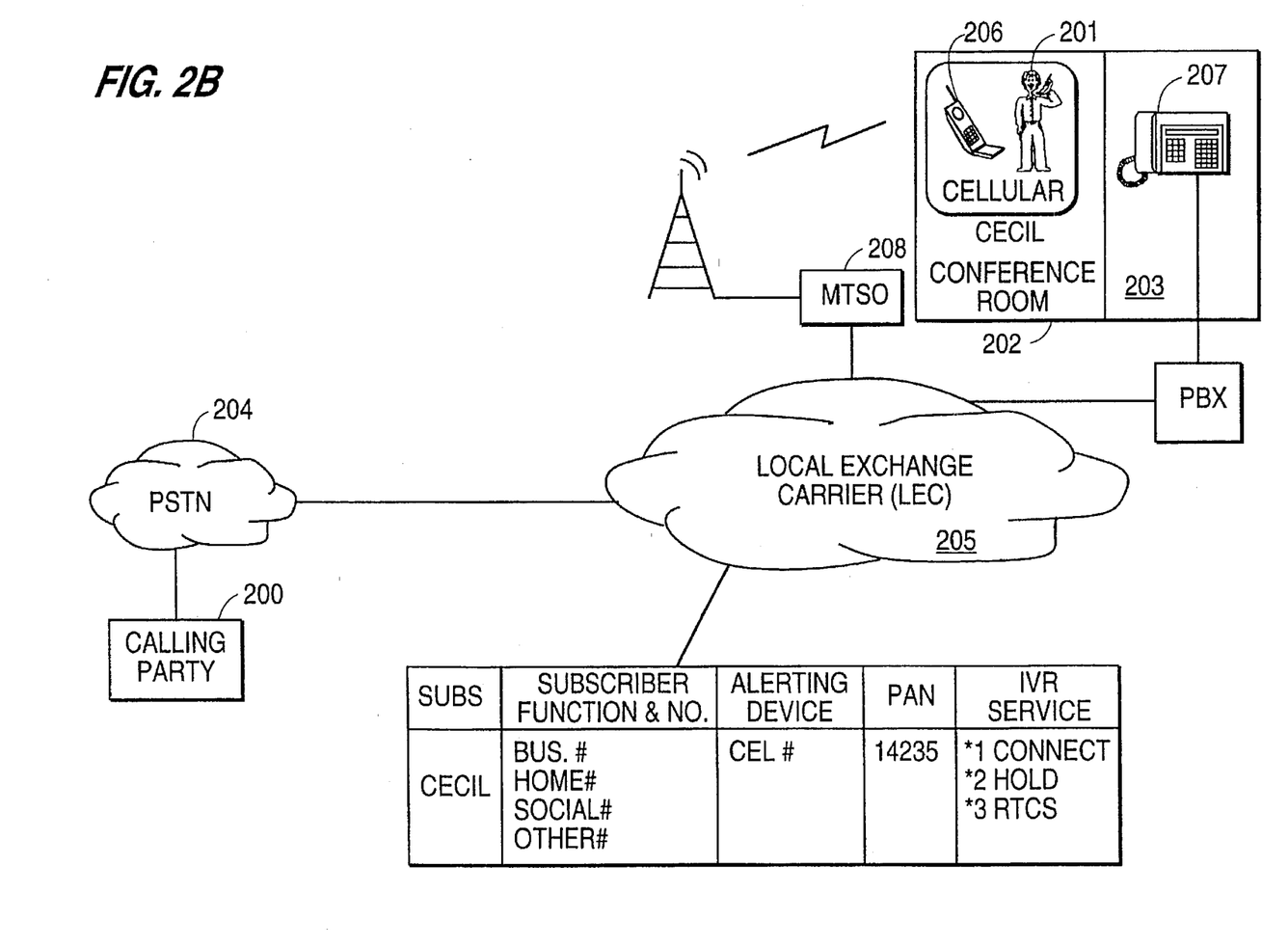
FIG. 2B illustrates a call scenario using the call-on-hold feature.

Referring now to FIG. 2B, we have shown a call scenario for the call-on-hold feature of the present invention. In its most basic form, the feature can be provided to a subscriber, without the use of CLID information of the calling party or the associated role of the called number. Thus, upon receiving an incoming call, the subscriber can instruct the service node via DTMF or signaling to offer a recorded announcement (RAN) to the caller, prompting it to wait. For example, if the subscriber is unable to answer the call at the time his alerting device is activated, but would still like to get connected, a terminal function key or combination thereof could be used, say *2, while the terminal is ringing or shortly after going off-hook to get connected to the service node. Upon receiving the DTMF tones, the service node will play the RAN message "please hold while your call is connected" to the calling party. In the mean time, the subscriber can move to a more suitable environment, dial the required DTMF connect code, say *1 and get connected to the calling party.

The subscriber can also make use, if available, of the call delivery using role or function associated numbers before activating the call-on-hold feature. In the call scenario of FIG. 2B, calling party 200 is attempting to reach the subscriber 201 who is located in a conference room 202 near the subscriber's office 203. The calling party 200 calls subscriber 201 in his BUSINESS role and thus dials his business telephone number. The PSTN 204 routes the call to the LEC associated with the dialed digits, i.e. LEC 205. At the LEC, the call is intercepted by the service node 10 (see FIG. 1B) and is determined to be directed to PCS subscriber 201. PCS subscriber 201 is making use of a cellular telephone 206 has the alerting device. Thus, the service node will instruct the host switch 11 to dial the subscriber's cellular number. The CLID & role will be routed from the LEC to the MTSO 208 which will page the subscriber on his cellular telephone 206. On his cellular telephone display, the subscriber will be able to identify that the incoming call has been associated with a Business role and will also identify who the caller is. In this example, the subscriber determines that the call is important enough to be answered. However, because the subscriber is in a meeting in conference room 202, he makes the decision to answer the call outside of conference room 202. On his cellular key pad, the subscriber enters *2. These digits are sent back from the cellular telephone 206 to the MTSO 208 and the service node 10 of LEC 205. At the service node, database 28 is read to determine what service is invoked for that subscriber when the keys *2 are pressed (see TABLE 3.0). For this subscriber, a call-on-hold service is provided. Thus, the service node 10 instructs the RAN 19 to send a recorded announcement to the calling party. The message could be "Please wait while we connect your call". While the calling party is on hold, the subscriber leaves the conference room 202. At this point, the subscriber has the option of answering the call outside the conference room on his cellular telephone 206 or walk over to his office telephone 207 to answer the call. If the call is answered on the cellular telephone, the subscriber presses *1 on the cellular telephone. If the call is answered from his desk telephone, the subscriber enters his Personal Access Number (PAN) from his office telephone, upon which the service node instructs the host switch to connect the subscriber to the calling party who was placed on hold.

In the above example, the subscriber 201 is making use of the telephone's display to determine who called and in what role, prior to making his decision to answer the call. As indicated above, in its most basic form, the call-on-hold service could be provided to a subscriber, without the use of CLID and role or function associated numbers delivered to the subscriber's telephone display. In this case, the subscriber would receive the incoming call and could invoke the call-on-hold feature, but would not be able to know who is calling and in what role.

Access-Independent-Handoff

Figure 2C:
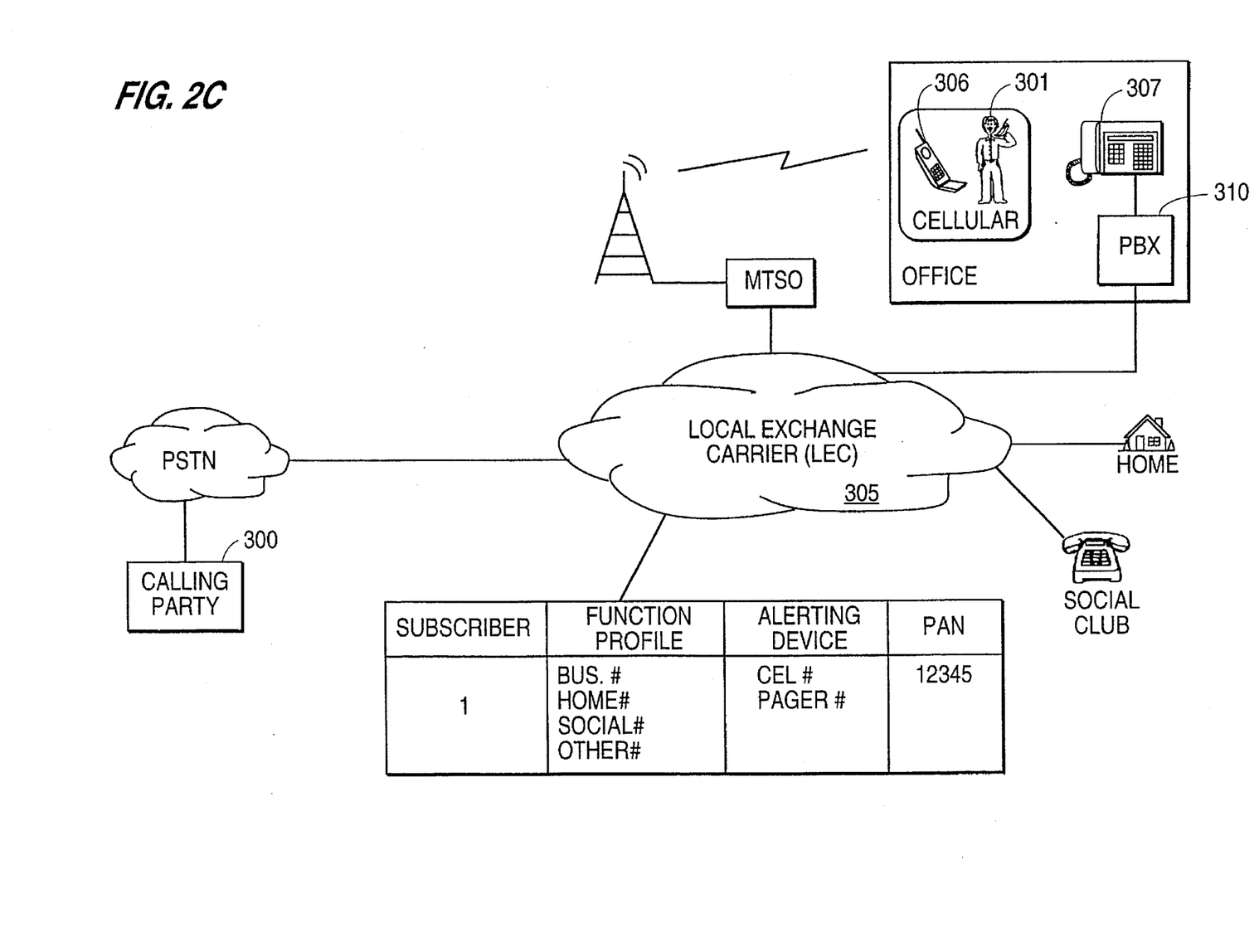
FIG. 2C illustrates the Access Independent Handoff call scenario.

In the call scenario of FIG. 2C, the subscriber can make use of an Access-Independent-Handoff feature. This feature is most useful when the subscriber 301 is already connected via his cellular telephone to the calling party 300, but would like to make use of his office telephone 307 without having to place the calling party on hold. For example, when on an active call on his cellular telephone, the subscriber may want to save airtime useage by using his desk phone. Similarly, the subscriber may initially have answered the incoming call from his desk telephone 307 but is required to leave his office while maintaining the call connection with the calling party. When subscriber 301 wishes to transfer the current call from his cellular telephone 306 to his desk telephone 307, the subscriber goes off-hook on the office telephone 307 and dials his Personal Access Number. By going off-hook, a line is secured from the office PBX 310 to the host switch 11 of the LEC 305 (shown in FIG. 1A). When the subscriber dials the PAN digits, the LEC accesses the service node 10 and identifies that the dialed PAN digits are associated with subscriber #1. The service node 10 then instructs the host switch 11 to make a connection to the current call by means of a conference bridge at the host switch 11. When a connection has been made at the desk telephone, the subscriber can press the END key on the cellular telephone keypad to hang-up and continue his conversation from the office telephone 307.

As indicated above, the handoff feature can also be initiated from the desk telephone 307 to transfer the call to the cellular telephone 306 by proceeding with the above steps by dialing the PAN from the cellular telephone.

Wide-Area-Virtual-Extension

Figure 2D:
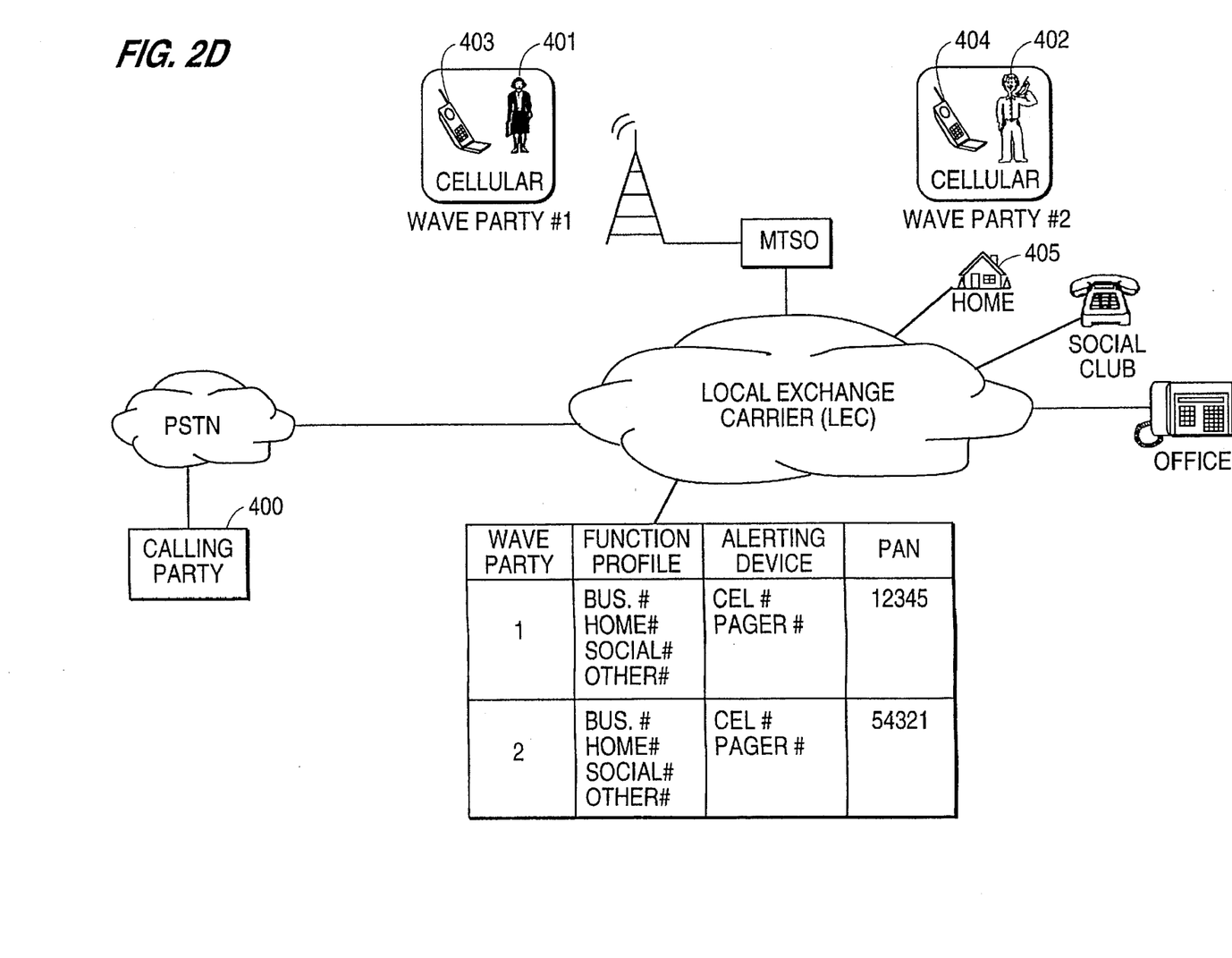
FIG. 2D shows the Wide Area Virtual Extension (WAVE) call feature scenario.

In the call scenario of FIG. 2D, subscribers 401 and 402 are making use of a Wide-Area-Virtual-Extension (WAVE) service to answer incoming calls. With this feature, incoming calls can be answered simultaneously at any telephone in the network identified by the subscribers as if the telephones were extensions to a single number. In the call scenario of FIG. 2D, WAVE party #1 and WAVE party #2 are using cellular alerting devices 403 and 404, respectively. Each alerting device would still function independently, able to send and receive calls as usual. Also, in the context of the role or function associated numbers, each subscriber can have a different BUSINESS role number. However, in the present example, both subscribers share a common WAVE PERSONAL number associated with home, i.e. both share the same residence 405. Similarly, in another scenario, two salesman could share a common WAVE BUSINESS number, associated with their sales office.

In operation, when calling party 400 dials, say, the PERSONAL number of WAVE subscribers #1 and #2, the call is intercepted by the host switch 11 of LEC 405 and the event is reported to the service node 10. Using the subscriber number and function profile database 27, the call will be identified as being directed to one or more WAVE subscribers. The subscriber service database 28 will identify that WAVE party #1 and WAVE party #2 are to be alerted of the incoming call. The service node can then scan the alerting device database 26 for the subscriber's associated alerting devices and directory numbers. In this case, cellular telephones 403 and 404. Each number is then dialed by the host switch 11 under the control of the service node 10 and routed to the MTSO to attempt to reach subscriber 401 and 402. Each subscriber, upon answering the call, is connected to the calling party as if they were extensions at home. If subscriber 401 answers the call before subscriber 402, the alerting device 404 of subscriber 402 can be made to ring longer to allow additional time for the second WAVE party to answer the call. Similarly, the ringing tone of the second alerting device could be made to ring differently once one of the WAVE party has answered the call. With the present embodiment, the subscribers can identify from their telephone displays, the name and CLID of the calling party, as well as the role associated with the called number, i.e. WAVE PRIVATE. This allow the subscribers to decide whether one or both party should answer the call. This service could of course be provided without calling and called number identification.

A more advanced embodiment of this feature would provide the WAVE parties with the name and/or CLID of the first associate WAVE party to answer the incoming call. For example, this could be useful when multiple members of the household are provided with the WAVE service. Once one of the WAVE party has answered the call, other members can identify who has answered and decide whether or not to conference in the call by answering the call. If they wish to conference in, after a predetermined lapse of time, they would dial in their PAN to get connected as well.

User-Controlled-Call-Screening

Figure 2E:
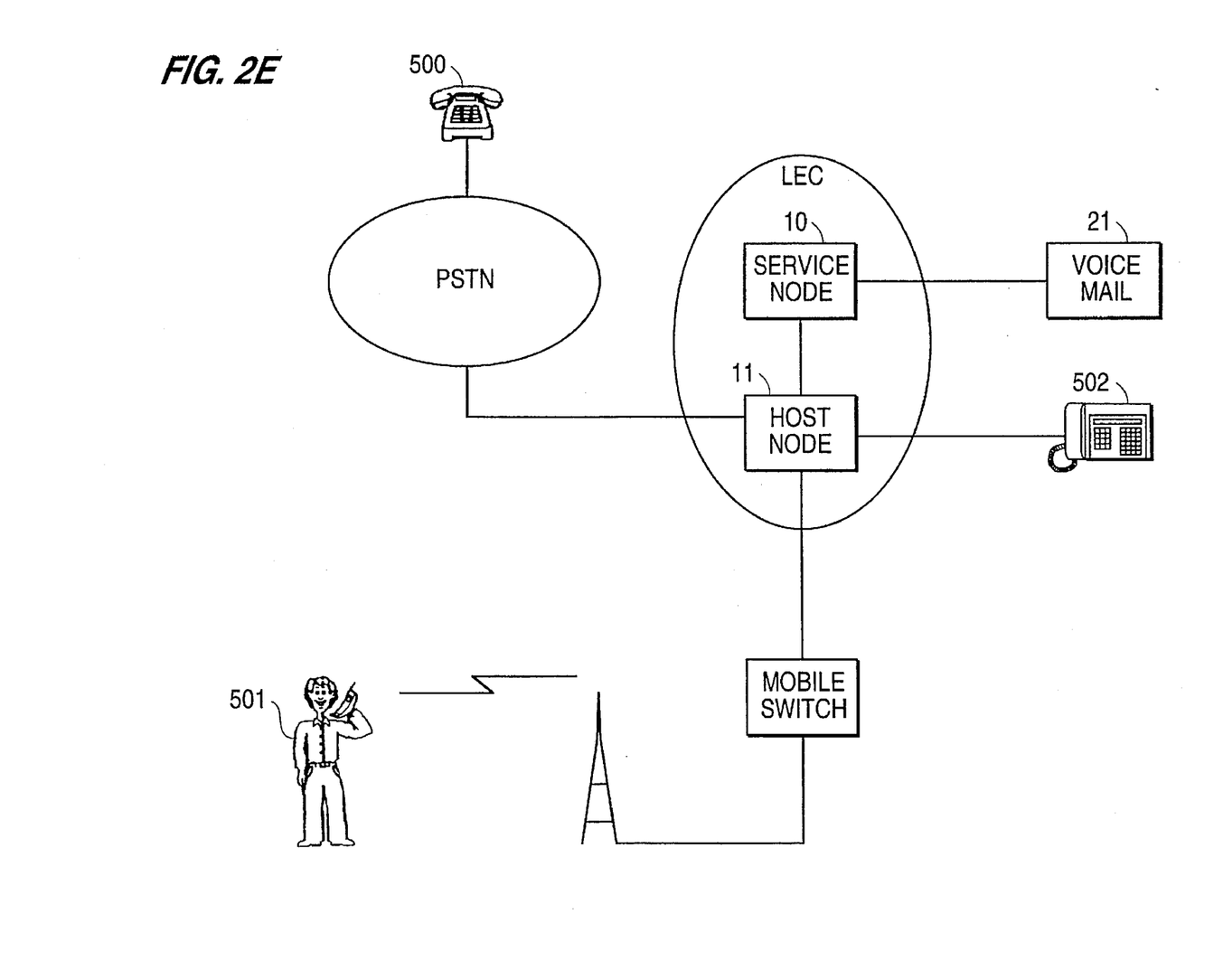
FIG. 2E shows a user-controlled real-time call screening scenario according to another PCS feature of the present invention.

Referring now to FIG. 2E, we have shown a block diagram illustrating the user-controlled-call-screening feature of the present invention. In this example, calling party 500 is attempting to reach the PCS subscriber at his office telephone 502. When the call is received at the host node 11, access is made to service node 10 to verify if the call is directed to a PCS subscriber, as explained above. The service node then dials the alerting device of the subscriber 501. If the subscriber does not have access to the caller's name and number (CNID or CLID) service or call delivery using role or function associated numbers, the subscriber will be unable to screen the incoming call. However, with the service described herein, the subscriber 501, can instruct the service node 10, say by pressing *3 upon being alerted of an incoming call, to provide call screening. When this service is activated, the service node instructs the host switch 11 to enable the voice mail 21 of the subscriber and sends a voice prompt to the calling party 500 to leave a message for the subscriber. At the same time the connection between the subscriber cellular telephone 501 and the host switch 11 is connected to the incoming call in such a way that the subscriber can listen in (one way only) while the calling party is in the process of recording a message on the voice mail unit 21 (see FIG. 1A). The host switch 11 connects the subscriber's cellular telephone 501 to the active call of the voice mail using a one-way voice path connection. If the subscriber recognizes the calling party or if the content of the message is important, the subscriber can connect to the calling party by pressing *1 instructing the service node that a connection is to be made with the calling party. The service node upon receiving the *1 command will instruct the host switch 11 to provide a 2-way voice path between the calling party 500 and cellular telephone 501 and will drop the voice mail connection, thus connecting both parties. A similar call screening service is disclosed in co-pending patent application Ser. No. 07/993,284 filed Dec. 18, 1992.

What is claimed is:

1. A method for providing call screening to subscribers of a personal communications service, comprising the steps of:

defining a respective role for each of a plurality of directory numbers assigned to a subscriber of said personal communications service;

storing a list of said directory numbers and the respective role corresponding to each of said directory numbers in a subscriber database associated with said subscriber;

assigning a network address corresponding to a call alerting device used by said subscriber;

storing said network address in said subscriber database;

accessing said subscriber database when a calling party places a call to one of said directory numbers on said list;

identifying the respective role defined for said one of said directory numbers;

transmitting, via a public switched telephone network (PSTN), a first signal indicating the identified role to said call alerting device via said network address; and transducing said first signal at said call alerting device and presenting said identified role to said subscriber.

2. A method as defined in claim 1, further comprising:

transmitting, via the PSTN, a second signal indicating a call source to said call alerting device via said network address; and transducing said second signal at said call alerting device and presenting said call source to said subscriber.

3. A method as defined in claim 1, wherein said list of directory numbers and corresponding roles stored in said subscriber database includes a directory number to be associated with a personal role and a directory number to be associated with a business role.

4. A method as defined in claim 3, wherein said list of directory numbers and corresponding roles stored in said subscriber database further includes a directory number to be associated with a social role.

5. A method as defined in claim 1, further comprising the steps of:

for each respective subscriber of a plurality of subscribers, performing the steps of defining respective roles for directory numbers assigned to said each respective subscriber, storing a list of the directory numbers assigned to the respective subscriber and the respective roles corresponding to said directory numbers in a respective database associated with the respective subscriber, assigning a respective network address corresponding to a call alerting device used by the respective subscriber, and storing said respective network address in the respective subscriber database; and responding to a call placed to a directory number stored in at least one subscriber database by a calling party by accessing each subscriber database containing said directory number to identify the respective role corresponding to said directory number in the respective subscriber database, transmitting a respective signal indicating the identified respective role to the respective call alerting device in the respective subscriber database, and transducing the respective signal at the respective call alerting device and presenting the identified respective role to the respective subscriber.

* * * * *